United States Patent [19]

Hiramatsu et al.

[11] 4,456,351

[45] Jun. 26, 1984

[54] FOCUS DETECTING DEVICE

[75] Inventors: Akira Hiramatsu; Masayoshi Yamamichi, both of Kanagawa, Japan

[73] Assignee: Canon Kabushiki Kaisha, Tokyo, Japan

[21] Appl. No.: 343,975

[22] Filed: Jan. 29, 1982

[30] Foreign Application Priority Data

| Feb. 5, 1981 | [JP] | Japan | 56-16211 |
| Feb. 5, 1981 | [JP] | Japan | 56-16219 |
| Feb. 5, 1981 | [JP] | Japan | 56-16220 |
| Feb. 6, 1981 | [JP] | Japan | 56-16415 |
| Feb. 6, 1981 | [JP] | Japan | 56-16416 |
| Feb. 10, 1981 | [JP] | Japan | 56-18222 |

[51] Int. Cl.³ .............................................. G03B 7/08
[52] U.S. Cl. ..................................... 354/402; 354/288
[58] Field of Search ................. 354/22, 23 R, 25, 154, 354/195, 59, 288, 64

[56] References Cited

U.S. PATENT DOCUMENTS

| 3,879,742 | 4/1975 | Smith | 354/64 |
| 4,000,497 | 12/1976 | Galbraith, Jr. | 354/59 |
| 4,314,747 | 2/1982 | Haraguchi et al. | 354/59 |
| 4,341,448 | 7/1982 | Toyoda et al. | 354/288 |
| 4,348,088 | 9/1982 | Yamamichi et al. | 354/59 |

Primary Examiner—Russell E. Adams
Attorney, Agent, or Firm—Toren, McGeady and Stanger

[57] ABSTRACT

A device which detects the focus condition of an optical system with respect to an object, includes a sensor having at least one sensing surface, the senor providing an electrical indication to associated circuitry corresponding to light which has passed through the optical system. A cleaning mechanism is operatively arranged with respect to the sensing surface of the sensor so as to keep the sensing surface clean, and thereby insure that the overall device operates properly to detect an infocus condition of the optical system.

20 Claims, 20 Drawing Figures

FOCUS DETECTING DEVICE

BACKGROUND OF THE INVENTION

1. Field of the Invention

This invention relates to focus detecting devices.

2. Description of the Prior Art

In a known, TTL in-focus detection device, light passing through a phototaking optical system is focused on a focus-detecting photoelectric transducer element located at a point conjugate to the film plane. In response, focus detecting output signals are produced by which the in-focus condition of the phototaking optical system is detected. Many proposals relating to this device have been made. When such in-focus detecting device is to be built into a single lens reflex camera or the like, it is necessary that it be arranged in a limited space within the black box of the camera. Hence, the device must be made quite small in size because of the fact that a portion of the object image is formed on a light-receiving surface of the focus-detecting photoelectric transducer element. In such an arrangement, dust and finely divided foreign particles floating in the interior of the black box may be deposited on the light receiving surface of the in-focus detecting photoelectric transducer element and may adversely influence the focus detecting signals formed by the same element. Counter-measure to this become a problem. That is, for example, if a pair of photosensitive element arrays each consisting of a plurality of minute photoelectric transducer elements are used in detecting an in-focus condition and two images of the same object formed on the respective arrays coincide in position with each other, so that when dust and foreign particles are deposited on a portion of the light incident surface of the photosensitive element arrays, the coincidence signal representing the in-focus state is disturbed. This causes faulty operation. Also, the so-called image sharpness degree detecting type device similarly suffers from the deposition of dust and foreign particles on the image receiving surface of a photosensitive element because this influences the focusing state of the image and, in effect, does nothing but provide an erroneous detection.

What has been discussed above is valid not only in the TTL type but also in the non TTL type focus detecting device, and further not only in the passive type but also in the active type devices. For example, even in a sonar type device utilizing supersonic waves, there also is a high possibility of the existence of dust and foreign particles on the sensing surface of a supersonic wave sensor to effect interference of the waves, thus causing the device to malfunction.

SUMMARY OF THE INVENTION

With the foregoing in mind, it is an object of the present invention to provide novel improvements over the prior focus detecting devices, which improvements are capable of readily avoiding the disadvantages of erroneous detection, or the deterioration of detection accuracy and detection performance, resulting from the deposition of dust and foreign particles on the sensing surface of the senor means as described above.

According to the present invention, a more advantageous form of a focus detecting device includes means for dust-proofing and/or cleaning the sensing surface of the senor means in the device.

It should be pointed out that, according to preferred embodiments of the present invention which will be more fully described later, the dust-proofing and/or cleaning means may be arranged to operate either by a special member accessible from the outside of the device, or in connection with an opening and closing operation of a power switch of the device, or, if the device is built in a camera, in connection with the exposure operation or the film winding operation in the camera. Also, when only cleaning is intended, particularly in application to cameras, other arrangements may be made such that the cleaning means operates in connection with opening and closing operation of the back cover when exchanging film, or, in the case of a single lens reflex camera, with the attaching and detaching operation of an interchangeable objective.

These and other objects and features of the invention will become apparent from the following detailed description of embodiments thereof by reference to the accompanying drawings.

BRIEF DESCRIPTION OF THE DRAWINGS

The present invention will next be described in connection with preferred embodiments thereof by reference to the drawings in which.

DETAILED DESCRIPTION OF THE PREFERRED EMBODIMENTS

Figure 1A:
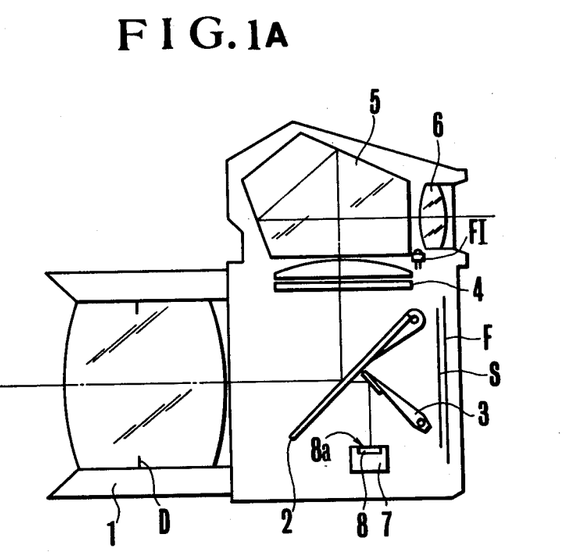
FIGS. 1A and 1B are schematic views of a single lens reflex camera having a focus detecting device of the TTL (Through The Lens) type, particularly illustrating the outline of an optical arrangement to which improvements of the present invention are applicable.
Figure 1B:
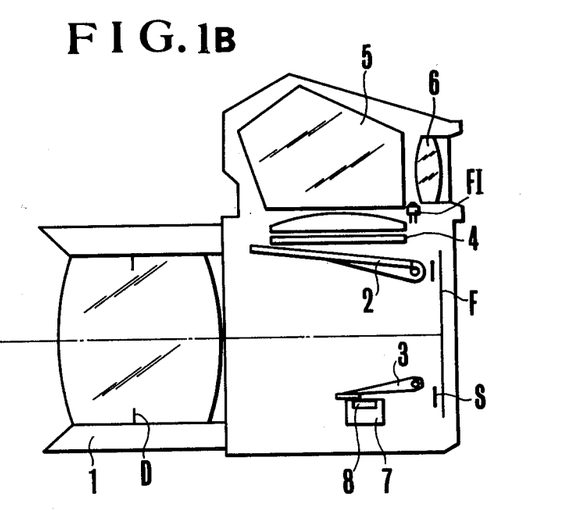

Referring first to FIGS. 1A and 1B, an example of a single lens reflex camera provided with a focus detecting device to which improvements of the present invention may be applied, is explained. The drawing shows an objective lens 1, and a main movable mirror 2 of which the surface as a whole or in part is constructed as a semi-transparent beam splitter. Also shown are a focusing screen 4, a penta prism 5, and an eye-piece 6, these parts constituting a finder optical system together with the objective lens 1 and main movable mirror 2. An auxiliary movable mirror 3 is positioned on the back of said main movable mirror 2 and arranged to direct the light beam passed through the main movable mirror 2 to an in-focus detecting device 7. Said in-focus detecting device 7 is arranged on the bottom of the mirror box to receive a light beam reflected from the auxiliary movable mirror 3, and forms a detection signal corresponding to the focus adjusting state of the objective lens system. It is noted that the same in-focus detecting device 7 has a known construction as an in-focus detecting device of the TTL (Through The Lens) type applicable to such a single lens reflex camera. For example, a sensor means 8 provided for focus detection is in the form of a photosensitive element having a light-receiving surface 8a as the sensing surface, and the in-focus detecting device 7 includes circuit means necessary to perform focus detection based on the output of said element 8.

Indicator means FI is provided for indicating a focus detection result in the finder, and is connected to the device 7. S represents a shutter, and F represents a film. Also, in the objective lens 1, D indicates a diaphragm.

FIG. 1A illustrates a position where focus detecting is being performed before shooting (film exposure), and FIG. 1B a position where the film F is being exposed.

Figure 2A:
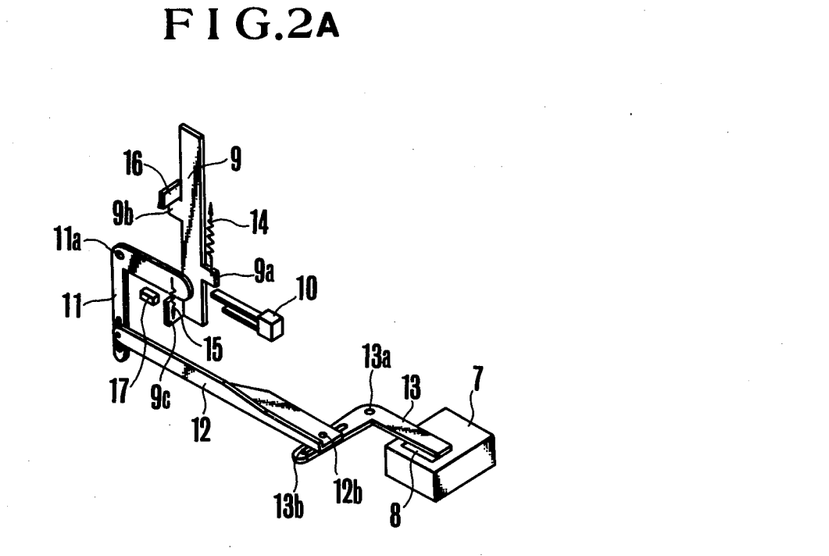
FIGS. 2A and 2B are perspective views of essential parts of a first embodiment of the present invention.
Figure 2B:
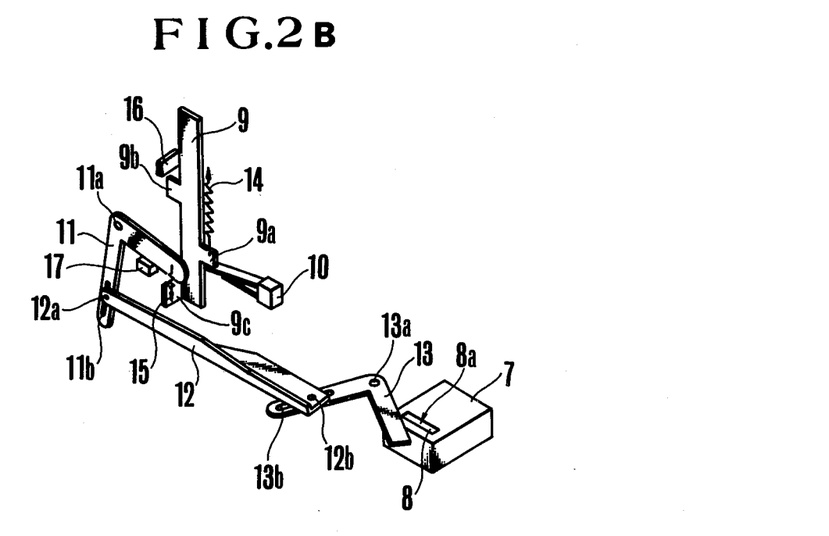

FIRST EMBODIMENT—FIGS. 2A AND 2B

The first embodiment of the present invention is concerned with the single lens reflex camera of such construction as described above, and provides for the focus detecting device 7 arranged in the mirror box with a member for covering the light receiving surface 8a of the light-sensitive element 8. The member is arranged to be moved in response to opening and closing of a power switch of the in-focus detecting device 7 so that, except for the time when the in-focus detecting device 7 is in the operative position, the light receiving surface 8a of the light-sensitive element 8 is always covered to prevent depositing of dust and foreign particles on said light receiving surface 8a.

FIGS. 2A and 2B show a release lever 9, a switch 10 for rendering an electrical power source of the in-focus detecting device 7 ON and OFF, a rotary lever 11, a communication lever 12, a movable covering member 13 for covering the light receiving surface 8a of the light-sensitive element 8, a spring 14 for urging the release lever 9 upwards, a spring 15 for urging the rotary lever 11 in a clockwise direction, a latch member 16 for controlling upward movement of the release lever 9, and a stopper 17 for the rotary lever 11.

In FIG. 2A, the release lever 9 is urged by the spring 14 to move upwards, and is held in the illustrated position by the latch member 16 engaging an arm portion 9b. The rotary lever 11 is turned about a shaft axis 11a in a counterclockwise direction by an arm portion 9c of the release lever 9 against the spring 15, and, therefore, the communication lever 12 is pushed to the right by a pin 12a-and-slot 11b connection so that the covering member 13 is turned about a shaft 13a, through a pin 12b-and-slot 13b in a counterclockwise direction to the illustrated position.

FIG. 2A illustrates a position where the power switch 10 of the in-focus detecting device 7 is OFF, and the covering member 13 has covered the light receiving surface 8a of the photosensitive element 8 in the in-focus detecting device 7. From this position, when the release lever 9 is pushed down against the force of the spring 14, the power switch 10 of the in-focus detecting device 7 is turned ON by a drive cam 9a formed integrally with the release lever 9, and the rotary lever 11 is turned about the rotation shaft axis 11a in the clockwise direction by the force of the spring 15. At this time, the rotary lever 11 pulls the communication lever 12 to the left, and, therefore, the covering member 13 is turned about the rotation shaft 13a in the clockwise direction. Accordingly, the light receiving surface 8a of the photosensitive element 8 is exposed, thus reaching a position illustrated in FIG. 2B. Upon removal of the force from the release lever 9, the position of FIG. 2A is again attained.

Though, in this embodiment, the ON and OFF operation of the switch 10 of the in-focus detecting device 7 is controlled by the release lever 9, another separate member, for example, a special switch may be provided for controlling the ON and OFF state of the electrical power source of the in-focus detecting device 7.

Figure 3A:
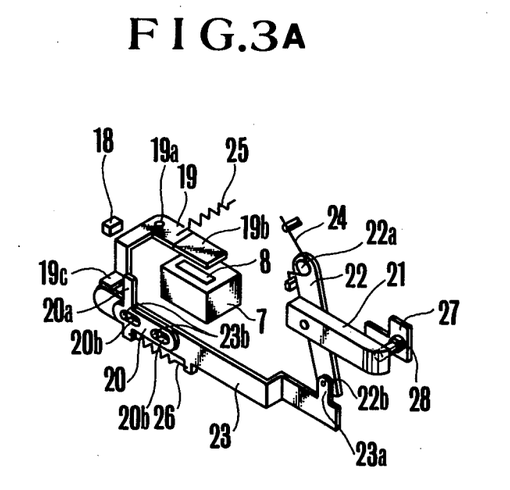
FIGS. 3A and 3B are perspective views of essential parts of a second embodiment of the present invention.
Figure 3B:
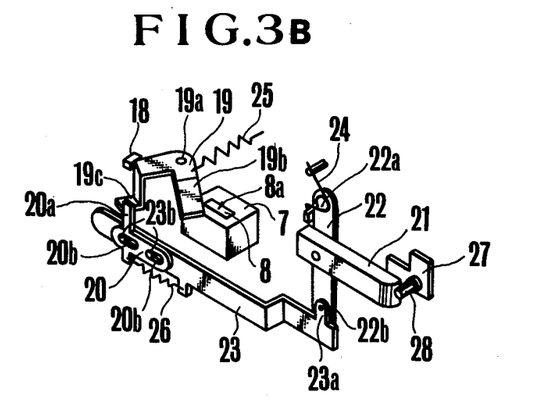

SECOND EMBODIMENT—FIGS. 3A AND 3B

The second embodiment of the present invention provides an optical protecting member for preventing deposition of dust and foreign particles in front of the light-receiving surface of the photosensitive element in the in-focus detecting device. The protecting member is arranged to be manually movable so that the dust and foreign particles deposited on said optical member can occasionally be wiped up.

FIGS. 3A and 3B show a lever 19 having, at one end thereof, a protection optical member 19b for protecting the light receiving surface 8a of the photosensitive element 8 in the in-focus detecting device 7; a lever 20 with its projected arm 20a abutting on the tail end 19c of said lever 19; a control lever 21 exposed outside of the camera housing (not shown); a lever 22 supporting said control lever 21 and rotatable about a shaft 22a; a lever 23 connected at an extension 23a thereof to the tail end of said lever 22 by a pin 22b and carrying the lever 20 through pin 23b-and-slot 20b connections; a spring 24 urging the lever to turn about the shaft 22a in a counterclockwise direction; a spring 25 urging the lever 19 to turn about a shaft axis 19a in a counterclockwise direction; a spring 26 urging the lever 20 to the left with reference to the lever 23; a stopper 18 for latching the lever 19; a stopper 28 for latching the control lever; and a leaf spring 27 supporting said stopper 28.

In FIG. 3A, the lever 19 is urged by the spring 25 in the counterclockwise direction to engage at its tail end 19c with the projected arm 20a of the lever 20 so that the protection optical member 19b provided in the form of a unit with the lever 19 assumes the illustrated position for protecting the light receiving surface of the photosensitive element 8. When the control lever 21 is moved to the left, motion of the lever 21 is transmitted through the support lever 22, lever 23 and lever 20 to turn the lever about the rotation shaft axis 19a in the clockwise direction, thereby the protection optical member 19b is retracted from the front of the light receiving surface 8a of the photosensitive element 8. At this time, the control lever 21 is held in the illustrated position of FIG. 3B by the stopper 28. In such position illustrated in FIG. 3B, the dust and foreign particles adhered to the protection optical member 19b provided on the lever 19 can be easily wiped up by using a brush inserted through a lens mount aperture (not shown).

THIRD AND FOURTH EMBODIMENTS—FIGS. 4A, 4B AND 5A TO 5D

The third and fourth embodiments of the invention have been made by taking into account the fact that when the single lens reflex camera is stripped of any releasably attached members, for example, the interchangeable objective lens and finder portion from the neighbourhood of the mirror box, so that the mirror box is opened at the corresponding sides, there exists a high possibility that dust and foreign particles floating in the air tend to enter the mirror box through the opened sides. These embodiments thus provide for the light receiving surface of the photosensitive element in the in-focus detecting device to have a shielding member rendered effective at such time, whereby the contamination of the light receiving surface with dust and foreign particles is prevented, and the reliability of the in-focus detecting device is improved.

The third embodiment is explained by reference to FIGS. 4A and 4B. These figures show a drive lever 29; a support lever 30 supporting the drive lever 29; a spring 31 urging the support lever 30 to turn about a rotation axis 30a in a clockwise direction; a stopper 32; a shielding plate 33 for shielding the light receiving surface 8a of the photosensitive element 8; a stopper 34 for blocking the drive lever 29; a drive pin 36 provided on the objective lens 1 side in fixedly secured relation and engageable with the above-described drive lever 29.

Figure 4A:
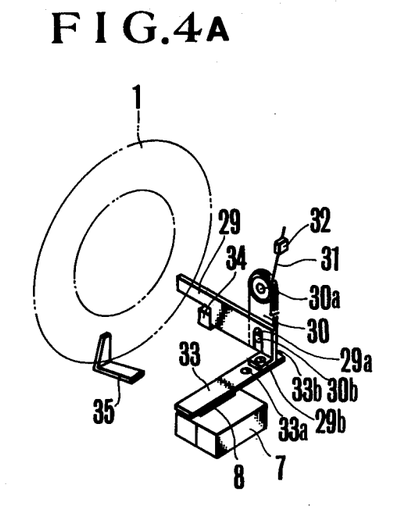
FIGS. 4A and 4B are perspective views of essential parts of a third embodiment of the present invention.

FIG. 4A illustrates the non-attached position of the objective lens 1, where the support lever 30 is urged by the spring 31 to turn about the rotation axis 30a in the clockwise direction, which, at this time, pushes the drive lever 29 to the left through the pin 30b-and-slot 29a connection so that the lever 29 is latched by the stopper 34. The shielding plate 33 arranged to be rotatable about the rotation axis 33a engages, at an elongated slot 33b, a pin 29b fixedly mounted on the drive lever 29, thus shielding the light receiving surface of the photosensitive element 8.

Figure 4B:
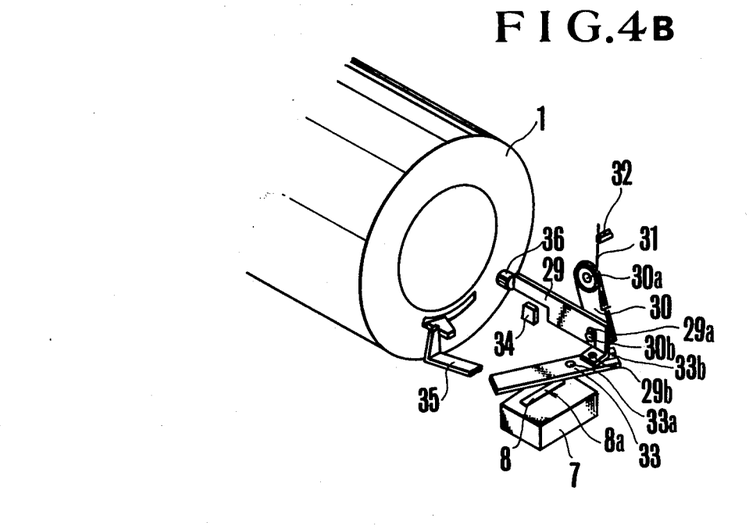

As illustrated in FIG. 4B, when the objective lens is attached, the drive pin 36 arranged on the rear end surface of the lens mount in fixed relation, engages the drive lever 29, and the shielding plate 33 turns about the rotation axis 33a in the clockwise direction, thus retracting from the front of the light receiving surface 8a.

FIGS. 4A and 4B also show an automatic diaphragm lever 35 which is known in the art.

Next, the fourth embodiment is explained by reference to FIGS. 5A to 5D.

The figures show a shielding plate 33' for the light receiving surface 8a of the photosensitive element 8 in the in-focus detecting device; a lever 37 for engagement with the fixed pin 36 on the objective lens 1 side; a lever 38 supporting said lever 37 and provided with a cam 38a to abut on the shielding plate 33'; a lever 39 for transmitting movement according to the attached and detached state of a finder unit to the camera body side; a lever 40 engaging said lever 39 and provided with a cam 40a to abut on the abovedescribed shielding plate 33'; a stopper 41 for latching the lever 37; a spring 42 urging the support lever 38; a spring 43 urging the lever 40; a stopper 44 for latching the lever 39; stoppers 45 and 46 for the springs 42 and 43 respectively; a spring 47 urging the shielding plate 33' to turn about the rotation shaft axis 33a' in a clockwise direction; and an interchangeable finder unit 48.

Figure 5A:
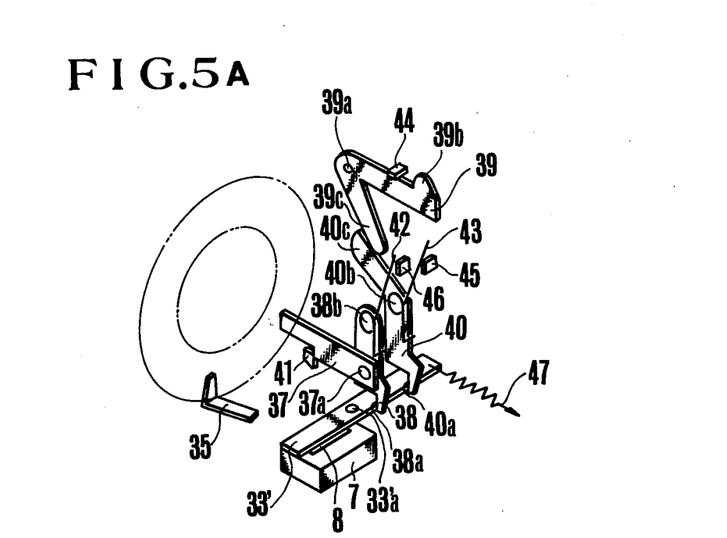
FIGS. 5A to 5D are perspective views of essential parts of a fourth embodiment of the present invention.
Figure 5B:
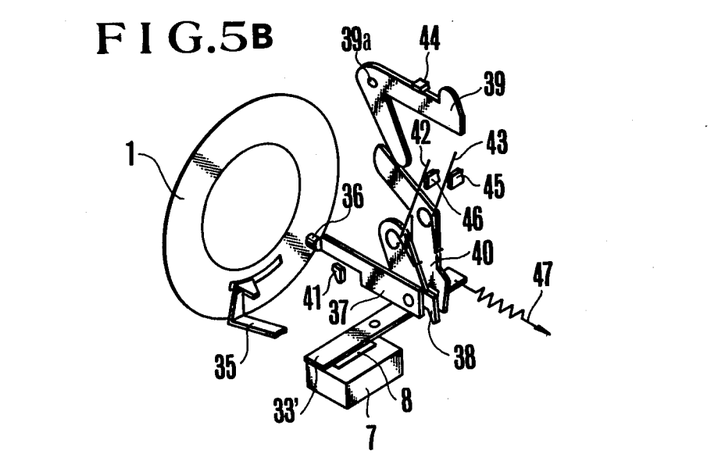
Figure 5C:
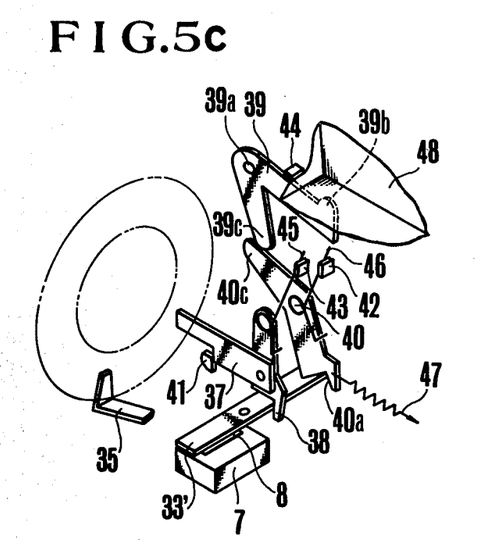
Figure 5D:
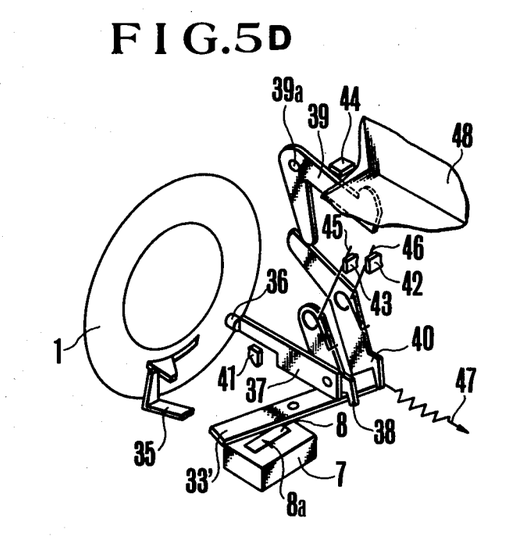

FIG. 5A illstrates a position when the objective lens and finder unit are both not attached yet, FIG. 5B a position when the objective lens alone is attached, FIG. 5C a position when the finder unit alone is attached, and FIG. 5D a position when the objective lens and finder unit are both attached.

In FIG. 5A, the support lever 38 is urged by the spring 42 to turn about the rotation axis 38b in the counterclockwise direction, and the lever 37 by connecting at a fixedly mounted pin 37a thereon to the lever 38, is latched by the stopper 41. Also, the lever 40 is urged by the spring 43 to turn about the rotation axis 40b in the counterclockwise direction, and abuts at its tail end 40c on the tail end 39c of the lever 39, while said lever 39 is latched by the stopper 44. The lever 38 and lever 40 engage at their camming surfaces 38a and 40a with the shielding plate 33', so that the shielding plate 33' is in the illustrated position for shielding the light receiving surface 8a of the photosensitive element 8.

In FIG. 5B, when the objective lens 1 is attached, the pin 36 engages the lever 37 and the same lever 37 is moved to the right, and further the support lever which is connected to the lever 37 turns in the counterclockwise direction, so that the camming surface 38a of the lever 38 is disengaged from the shielding plate 33'. But the camming surface 40a of the lever 40 latches the shielding plate 33' in the illustrated position of FIG. 5B where the light receiving surface 8a remains shielded.

Also when the finder unit 48 only is attached, the same finder unit 48 abuts on the projected portion 39b of the lever 39, and the same lever 39 is turned about the rotation axis 39a in the clockwise direction which causes the lever 40 to turn in the counterclockwise direction in abutting engagement therewith, so that the same lever 40 is disengaged at its camming surface 40a from the shielding plate 33'. But the camming surface 38a of the lever 38 latches the shielding plate 33' so that the light receiving surface 8a of the photosensitive element remains shielded as illustrated in FIG. 5C.

When the objective lens 1 and finder unit 48 are both attached to the camera body, as illustrated in FIG. 5D, the camming surfaces 38a and 40a are taken out of engagement with the shielding plate 33', and the shielding plate 33' is turned by the spring 47 about the rotation axis 33'a in the clockwise direction. The plate 33' is thus retracted from the front of the light receiving surface 8a of the photosensitive element 8 in the in-focus detecting device 7.

Figure 6A:
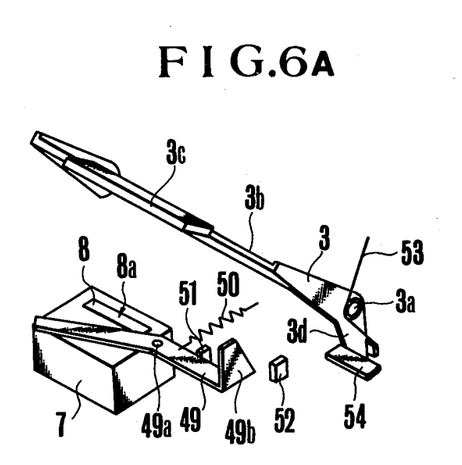
FIGS. 6A and 6B are perspective views of essential parts of a fifth embodiment of the present invention.
Figure 6B:
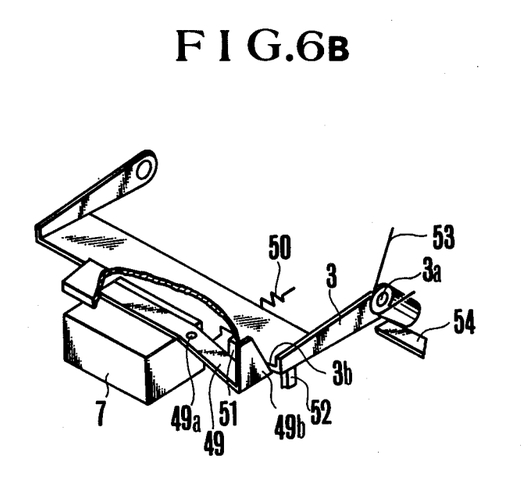

FIFTH EMBODIMENT—FIGS. 6A AND 6B

The fifth embodiment of the present invention provides a cleaning means for wiping off dust and foreign particles from the light receiving surface of the photosensitive element in the in-focus detecting device in response to, for example, actuation of a camera release. Therefore, without influencing the operation of the in-focus detecting device, the light receiving surface is always made clean to assure the high reliability of the device.

FIGS. 6A and 6B show a cleaning member 49 for wiping up the light receiving surface 8a of the photosensitive element 8 in the in-focus detecting device, constructed and arranged so that a soft member contacts the light receiving surface 8a of the photosensitive element. Also shown are a spring 50 for urging said cleaning member 49; a stopper 51 for the cleaning member 49; a stopper 52 for the auxiliary movable mirror 3; a spring 53 for urging the auxiliary movable mirror 3; and a lever 54 for driving the auxiliary movable mirror 3.

FIG. 6A illustrates a non-shooting position where the auxiliary movable mirror 3 is urged by the spring 53, latched by the lever 54 and reflects the light beam passed through the main movable mirror 2 (FIG. 1A) from its reflection surface 3c to the photosensitive element 8. The cleaning member 49 is urged by the spring 50 to turn about the rotation axis 49a in the counterclockwise direction, latched by the stopper 51, and retracted from the light receiving surface 8a of the photosensitive element 8. From this position of FIG. 6A, upon actuation of a release, as illustrated in FIG.

6B, the lever 54 pushes the auxiliary movable mirror at its cam surface 3d against the spring 53, so that the auxiliary movable mirror 3 is moved away from the photo-taking optical path to the illustrated position of FIG. 6B. As the camming surface 3b of the auxiliary movable mirror 3 engages with the camming surface 49b provided on the cleaning member 49, the cleaning member 49 is turned about the rotation axis 49a in the clockwise direction against the spring 50, while wiping the light receiving surface 8a of the photosensitive element 8. When the exposure operation is terminated, the auxiliary movable mirror 3 and the cleaning member 49 are returned to their positions of FIG. 6A by the springs 53 and 50 respectively.

Figure 7A:
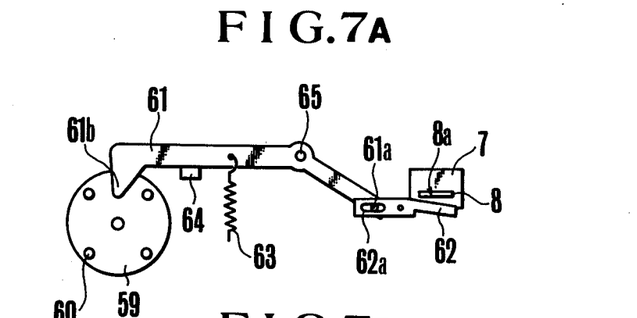
FIGS. 7A to 7C are plan views of essential parts of a sixth embodiment of the present invention and of an example of a modification of a part thereof.
Figure 7B:
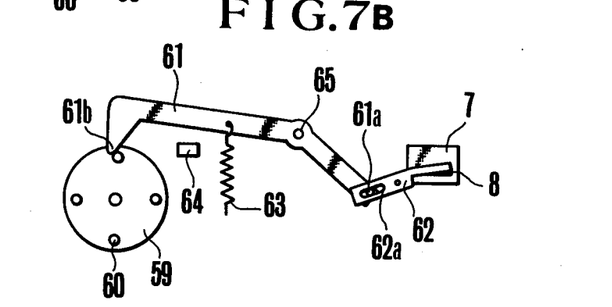
Figure 7C:
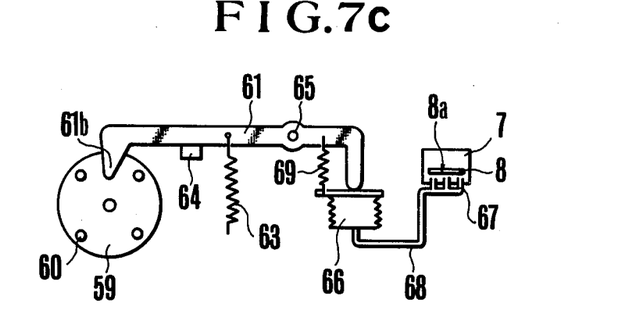

SIX EMBODIMENT AND AN EXAMPLE OF PARTIAL MODIFICATION THEREOF—FIGS. 7A TO 7C

The sixth embodiment of the present invention provides a cleaning means for the light receiving surface of the photosensitive element arranged to move following the exposure operation, for example, in response to a film winding up operation, so that high reliability of the in-focus detecting device in the camera is assured.

Upon reference first to FIGS. 7A and 7B, in the drawings, a rotary member 59 is responsive to the winding operation; actuator pins 60 are arranged in unison with the rotary member 59 and form part of a one-series winding system together with the rotary member 59. A communication lever 61 is engageable with the actuator pins 60; an actuator pin 61a is arranged in unison with said communication lever 61; a cam 61b engages with the actuator pin 60; and a cleaning member 62 is reciprocatingly movable on the light receiving surface 8a of the photosensitive element 8 in the in-focus detecting device 7 to remove contamination from the light receiving surface 8a, at least the surface which contacts with the light receiving surface 8a of the photosensitive element 8 being formed by a soft material. Also shown are a spring 63; a stopper 64 for limiting the range of movement of the communication lever 61; and a pivot shaft axis 65 of the communication lever 61.

In FIG. 7A, the communication lever 61 is urged by the spring 63 to turn about the shaft axis 65 in the counterclockwise direction and is held in the illustrated position in engagement with the stopper member 64.

The cleaning member 62 is connected at its elongated slot 62a to the actuator pin 61a and is held in the illustrated position. The rotary member 59 responsive to one cycle of winding operation advances for example, an angle of rotation of about 90°, for example, in the counterclockwise direction. The rotary member 59 is related to the winding system so that during the time when one cycle of winding operation is carried out, one of the actuator pins 60 once strikes the cam 61b.

In such construction, during the winding operation, as the rotary member 59 turns in the counterclockwise direction, the actuator pin 60 engages with the cam 61b and, as it further turns, pushes the cam 61b upwards to the position of FIG. 7B where the communication lever 61 is turned in the clockwise direction about the pivot shaft axis 65. As a result, the cleaning member 62 moves rotatively in the counterclockwise direction on the light receiving surface 8a of the photosensitive element 8, thus performing a cleaning operation. As the rotary member 59 furthermore rotates, when the winding operation is terminated, the actuator pin 60 is disengaged from the cam 61b, permitting the communication lever 61 to be turned by the spring 63 about the shaft 65 in the counterclockwise direction, while simultaneously turning the cleaning member 62 in the clockwise direction to the position illustrated in FIG. 7A. In this embodiment, the cleaning operation is carried out once for every one cycle of winding operation. But, for example, if only one actuator pin 60 is on the single rotary member 59, one cleaning operation occurs in every four cycles of winding operation, thereby giving the advantage that the structure is simplified.

FIG. 7C illustrates an example of a modification of the above-described sixth embodiment in which instead of the cleaning member in the sixth embodiment illustrated in FIGS. 7A and 7B, an air blow to the light receiving surface 8a of the photosensitive element 8 is used to clean up the light receiving surface 8a. FIG. 7C shows a blower 66; nozzles 67 with their openings facing at the light receiving surface 8a; a pipe 68 interconnecting the blower 66 and the nozzles 67; and a spring 66'.

This modified embodiment operates in such a manner that rotative movement of the communication lever 61 is converted to a piston movement of the blower 66, and the air in the interior of the same blower 66 is conducted through the pipe 68 to eject from the nozzles 67 in a jet on the light receiving surface 8a of the photosensitive element 8, thus performing a cleaning operation. This modified embodiment is also able to perform the various operations such that the above-described cleaning operation is carried out once for every one, or desired number of, cycle or cycles of winding operation as in the sixth embodiment.

Figure 8A:
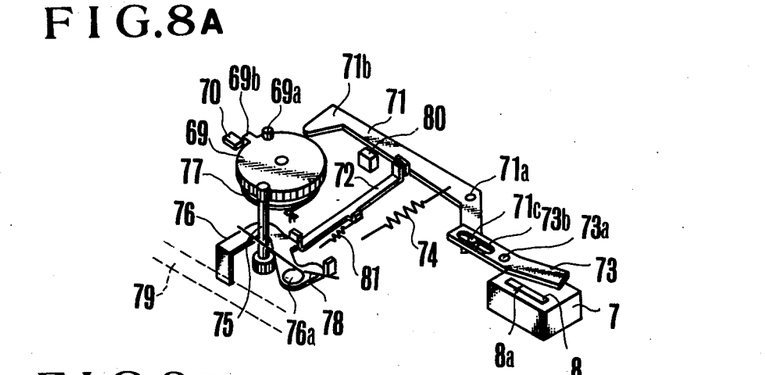
FIGS. 8A to 8C are perspective views of essential parts of a seventh embodiment of the present invention and of an example of a modification of a part thereof.
Figure 8B:
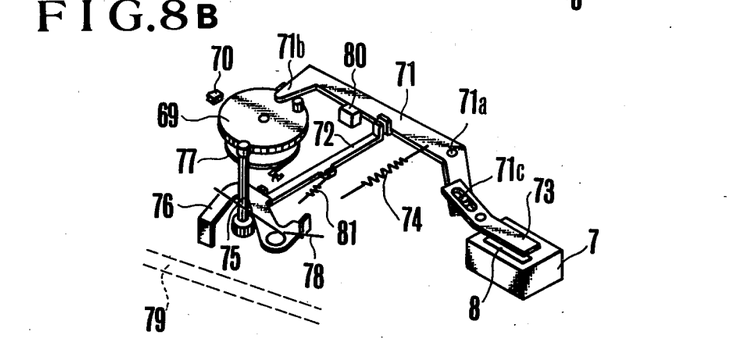
Figure 8C:
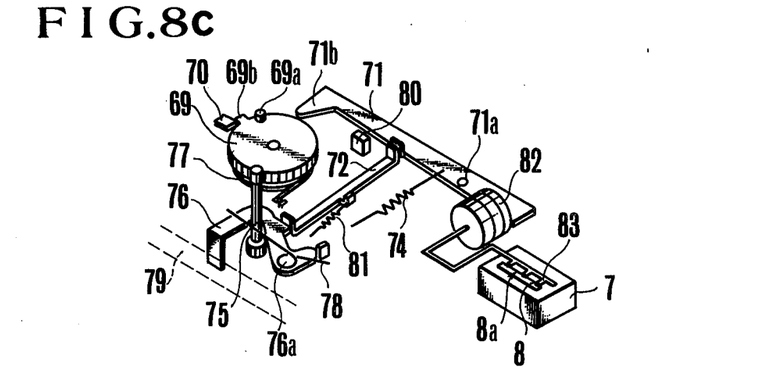

SEVENTH EMBODIMENT AND AN EXAMPLE OF MODIFICATION THEREOF—FIGS. 8A TO 8C

The seventh embodiment of the present invention provides another arrangement of cleaning means which cooperates with the back cover of the camera, so that without influencing the in-focus detecting device, the light receiving surface is cleaned up to assure high reliability of the in-focus detecting device.

FIGS. 8A and 8B show a rotary cam 69 to be charged by winding; a stopper 70 for limiting the range of movement of the rotary cam 69; a communication cam 71; a communication lever 72; a cleaning member 73 for cleaning up the light receiving surface 8a of the photosensitive element 8; a spring 74 urging the communication cam 71; a drive gear 75 for driving the rotary cam 69; a lever 76 responsive to the back cover for moving the drive gear 75; a spring 77 urging the rotary cam 69 to turn; a spring 78 constraining the drive gear 75; a back cover 79; a stopper 80 for latching the communication cam 71; a spring 81 urging the communication lever; a spring 82 urging the lever 76; and a stopper 83 for said spring.

In FIG. 8A, the rotary cam 69 is constructed in the form of a gear and is latched by the counterclockwise biased stopper 70. The drive gear 75 constrained by the lever 76 and spring 78 has its upper end cut to engage with the rotary cam 69, and its bottom end geared to mesh with a gear of the winding system (not shown), so that with the back cover 79 in the closed position, the moving lever 76 abuts on a portion of the back cover 79 and turns about a rotation axis 76a until the upper end of the drive gear 75 meshes with the geared surface of the rotary cam 69. Then each time one cycle of winding operation is performed, the rotary cam 69 is turned by one gear tooth. The communication cam 71, by being urged by the spring 74 to turn about a rotation axis 71a in the counterclockwise direction, is latched by the communication lever 72 which abuts on the moving lever 76 which, in turn, abuts on the back cover 79 in a position where the cam portion 71b of the communication cam 71 is retracted from above the rotary cam 69 as illustrated in FIG. 8A. The cleaning member or lever 73 is connected at an elongated slot 73b to a pin 71c fixed on the communication cam 71, and reciprocatingly turns about a rotation axis 73a. The part of the cleaning member 73 which contacts with the light receiving surface 8a of the photosensitive element 8 is formed as a soft member.

As has been described above, the rotary cam 69, responsive to a driving power transmitted from the film transport mechanism through a drive gear, is turned in the clockwise direction, while charging the spring 77. After the film has all been exposed, when the back cover is opened, the abutting relation of the back cover 79 and the lever 76 is broken, wherein the lever 76 is turned in the counterclockwise direction by the communication lever 72 under the action of the bias spring 81, and the operative relationship of the drive gear 75 and rotary cam 69 as determined by the lever 76 and spring 78, is cutoff. Then, the communication cam 71 is no longer in latched relation with the communication lever 72, and turns about the rotation axis 71a in the counterclockwise direction to the illustrated position of FIG. 8B to be latched by the stopper 80. In this position, the cam portion 71b stands ready on the rotary cam 69. On the other hand, the rotary cam 69, after having been cut off from operative relation with the drive gear 75, is turned in the counterclockwise direction by the force of the spring 77 to strike the standby communication cam 71 at its cam portion 71b so that the communication cam 71 is turned in the clockwise direction against the spring 74. Such motion is transmitted through the pin 71c and slot 73b to reciprocatingly turn the cleaning member 73. Then, the rotary cam 69 is latched by the stopper 70 engaging the detent member 69b of the rotary cam 69. Afterward, when the back cover is closed, the position of FIG. 8A is re-established.

In this embodiment, the cleaning means for the light receiving surface of the photosensitive element 8 in the in-focus detecting device is constructed in such form that the cleaning operation is caried out mechanically by a reciprocatingly moving lever. But it is possible to use a blower so that the cleaning operation is carried out by an air jet. This is exemplified in FIG. 8C. The drawing shows a blower 82 for producing a compressed air flow; nozzles 83 with their openings facing at the light receiving surface 8a of the photosensitive element 8; and a pipe 84 interconnecting said blower 82 and said nozzles 83. In this modified embodiment, the rotative motion of the communication cam 71 is converted to a piston movement of the blower 82, and the same blower 82 produces compressed air which is then conducted through the pipe 84 to blow from the nozzles 83 onto the light receiving surface 8a of the photosensitive element 8, thus performing a cleaning operation. The other parts are similar in construction to those shown in FIGS. 8A, 8B.

As has been described in great detail in connection with the several embodiments, according to the present invention, it is made possible by a very simple structure to maintain always clean the sensing surface of the sensor means for focus detection in an in-focus detecting device, and to prevent the production of an erroneous signal arising from dust and foreign particles deposited on the above-described sensing surface of the in-focus detecting device, with the great advantage that the in-focus detecting device can operate with high reliability.

What is claimed is:

1. A focus detecting device for detecting a focus condition of an optical system with respect to an object, comprising:
    (A) sensing means for focus detection,
    said sensing means having at least one sensing surface and producing an electrical indication corresponding to a sensed signal;
    (B) circuit means coupled to said sensing means for detecting the focus condition of the optical system with respect to the object on the basis of the electrical indication produced from the sensing means; and
    (C) means operatively arranged with respect to said sensing surface for keeping said sensing surface of the sensing means clean;
    said keeping means being constructed in the form of means for dustproofing said sensing surface of the sensing means;
    said dust-proofing means being arranged to be movable relative to said sensing surface of the sensing means.

2. The device according to claim 1, wherein said sensing means is sensitive to radiation and has a radiation receiving surface which forms said sensing surface; and
    said dust-proofing means has a radiation transmitting property.

3. A focus detecting device for detecting a focus condition of an optical system with respect to an object, comprising:
    (A) sensing means for focus detection,
    said sensing means having at least one sensing surface and producing an electrical indication corresponding to a sensed signal;
    (B) circuit means coupled to said sensing means for detecting the focus condition of the optical system with respect to the object on the basis of the electrical indication produced from the sensing means; and
    (C) means operatively arranged with respect to said sensing surface for keeping said sensing surface of the sensing means clean;
    (D) said keeping means being constructed in the form of a means for cleaning up said sensing surface of the sensing means.

4. The device according to claim 3, wherein said cleaning means is arranged to be movable relative to said sensing surface in order to mechanically wipe off dust on said sensing surface of the sensing means.

5. The device according to claim 3, wherein said cleaning means is formed so as to blow off the dust on said sensing surface of the sensing means by a flow of air.

6. The device according to claim 1, or 3, or 4, or 5, further comprising:
    means for operating said keeping means to clean said sensing surface of the sensing means.

7. The device according to claim 6, wherein said operating means is arranged to be manually operable from outside of the device.

8. The device according to claim 6, wherein said operating means is functionally related to actuation means of the device.

9. The device according to claim 6, wherein the device is incorporated in a camera and said operating means is functionally related to a photography operation mechanism of the camera.

10. The device according to claim 9, wherein said photography operation mechanism includes means for exposing film.

11. The device according to claim 9, wherein said photography operation mechanism includes means for winding of the camera.

12. The device according to claim 9, wherein said photography operation mechanism includes means for attaching an exchangeable photo-taking lens to the camera body.

13. The device according to claim 12, wherein said photography operation mechanism includes means for attaching an exchangeable view finder unit to the camera body.

14. The device according to claim 9, wherein said photography operation mechanism includes means for attaching an exchangeable view finder unit to the camera body.

15. The device according to claim 9, wherein said photography operation mechanism includes means for opening and closing a film chamber.

16. The device according to claim 3, or 5, or 6, or 7, wherein said sensing means is sensitive to radiation and has a radiation receiving surface which forms said sensing surface.

17. The device according to claim 16, wherein said sensing means is arranged to receive image light coming through said optical system.

18. The device according to claim 17, wherein said optical system is an objective lens system in a camera.

19. A focus detecting device for detecting a focus condition of an optical system with respect to an object, comprising:
(A) sensing means for focus detection,
said sensing means having at least one sensing surface and producing an electrical indication corresponding to a sensed signal;
(B) circuit means coupled to said sensing means for detecting the focus condition of the optical system with respect to the object on the basis of the electrical indication produced from the sensing means;
(C) means operatively arranged with respect to said sensing surface for keeping said sensing surface of the sensing means clean; and
(D) means for operating said keeping means with reference to said sensing surface of the sensing means.

20. A focus detecting device for detecting a focus condition of an optical system with respect to an object, comprising:
(A) sensing means for focus detection,
said sensing means having at least one sensing surface and producing an electrical indication corresponding to a sensed signal;
(B) circuit means coupled to said sensing means for detecting the focus condition of the optical system with respect to the object on the basis of the electrical indication produced from the sensing means;
(C) means operatively arranged with respect to said sensing surface for keeping said sensing surface of the sensing means clean;
said keeping means being constructed in the form of means for dustproofing said sensing surface of the sensing means; and
(D) means for operating said keeping means with reference to said sensing surface of the sensing means.

* * * * *